US005140203A

United States Patent [19]

Reder et al.

[11] Patent Number: 5,140,203

[45] Date of Patent: Aug. 18, 1992

[54] CONTROL MOTOR FOR A SERVO-VALVE

[75] Inventors: Herbert Reder, Bergrothenfels; Hans-Georg Schubert, Partenstein, both of Fed. Rep. of Germany

[73] Assignee: Mannesmann Rexroth GmbH, Lohr, Fed. Rep. of Germany

[21] Appl. No.: 723,657

[22] Filed: Jun. 26, 1991

Related U.S. Application Data

[63] Continuation of Ser. No. 412,454, Sep. 26, 1989, abandoned.

[30] Foreign Application Priority Data

Sep. 27, 1988 [DE] Fed. Rep. of Germany ....... 3832780

[51] Int. Cl.[5] ........................ H02K 3/16; H02K 33/00; H02K 3/20; H01F 7/10

[52] U.S. Cl. ...................................... 310/29; 310/183; 335/244

[58] Field of Search ................. 310/29, 51, 68 R, 182, 310/183; 318/119-134; 335/243, 244, 245; 188/267; 251/129.01, 129.06, 129.12, 129.13, 129.09

[56] References Cited

U.S. PATENT DOCUMENTS

| | | | |
|---|---|---|---|
| 1,979,709 | 11/1934 | Schaelchlin et al. | 335/244 |
| 2,063,340 | 12/1936 | Ruben | 310/183 |
| 2,162,465 | 6/1939 | Guilder . | |
| 2,246,305 | 6/1941 | Kilgore | 310/183 |
| 3,113,229 | 12/1963 | Jacobs | 310/183 |
| 3,301,141 | 1/1967 | Griffing . | |
| 3,553,512 | 1/1971 | Vettermann | 310/182 |
| 4,742,322 | 5/1988 | Johnson et al. | 310/29 |
| 4,761,575 | 8/1988 | Reder et al. . | |

FOREIGN PATENT DOCUMENTS

| | | | |
|---|---|---|---|
| 2310545 | 9/1973 | Fed. Rep. of Germany | 310/29 |
| 2741870 | 3/1979 | Fed. Rep. of Germany | 310/183 |
| 3413959 | 10/1984 | Fed. Rep. of Germany . | |
| 3333602 | 5/1985 | Fed. Rep. of Germany . | |
| 3533817 | 4/1987 | Fed. Rep. of Germany . | |
| 0013114 | 2/1978 | Japan | 310/182 |
| 0126112 | 11/1978 | Japan | 310/51 |
| 1224917 | 4/1986 | U.S.S.R. | 310/182 |
| 1339773 | 9/1987 | U.S.S.R. | 310/51 |
| 532905 | 2/1941 | United Kingdom . | |

OTHER PUBLICATIONS

Schmitt, A.; "The Hydraulic Trainer", p. 49, G. L. Rexroth GmbH, Lohr am Main, West Germany, no date.

*Primary Examiner*—Steven L. Stephan
*Assistant Examiner*—C. LaBalle
*Attorney, Agent, or Firm*—Cushman, Darby & Cushman

[57] ABSTRACT

A control motor for a servo-valve includes elements of a control motor including a yoke, permanent magnet, control coil and armature mounted to one another. An output member transmits the pivotal movements of the armature. A frequency dependent passive electric dampening means is formed as an annular disc, and located adjacent the control means to compensate for non-linearities in frequency response.

6 Claims, 5 Drawing Sheets

FIG. 6
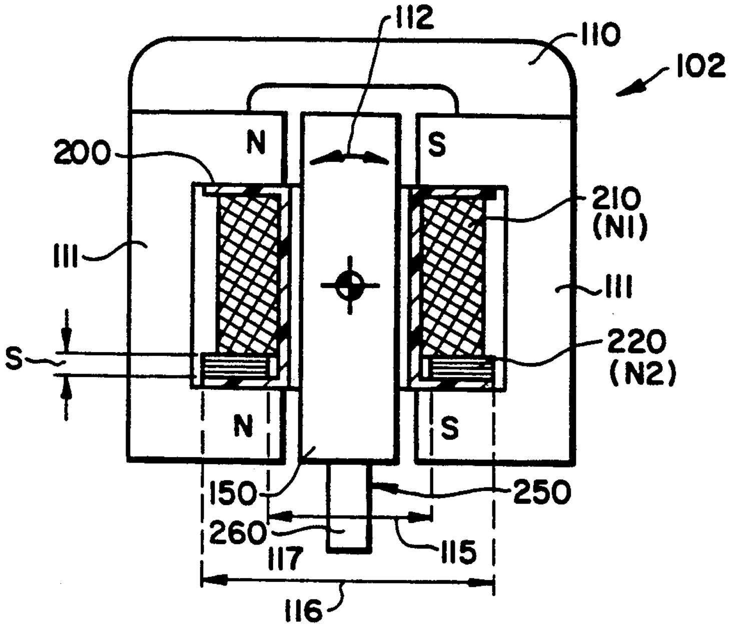
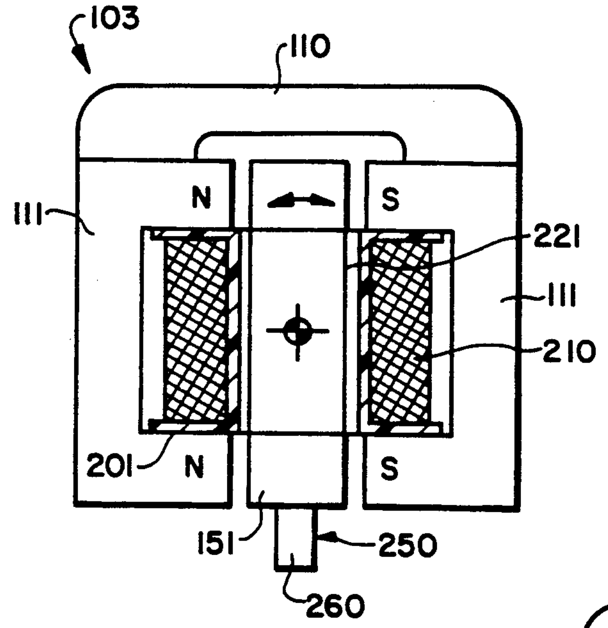
FIG. 7
FIG. 8
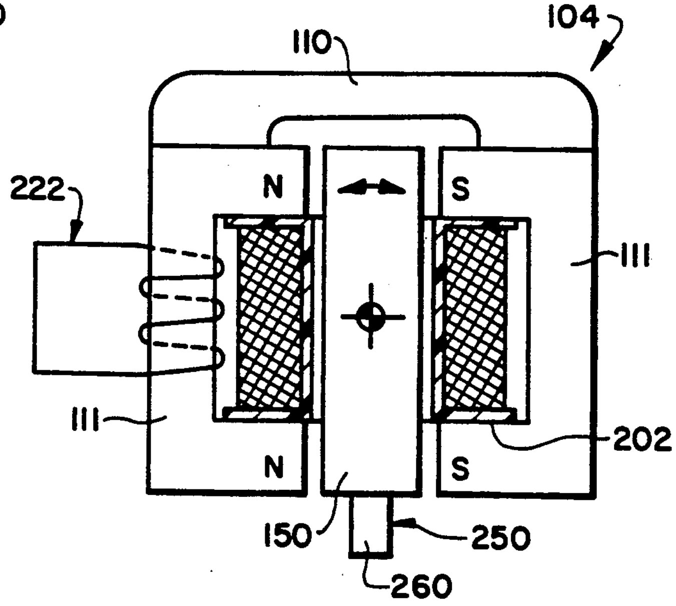

CONTROL MOTOR FOR A SERVO-VALVE

This is a continuation of application Ser. No. 07/412,454, filed Sep. 26, 1989, which was abandoned.

TECHNICAL FIELD

The invention relates to an electric control motor which is particularly useful in connection with a servo-valve.

BACKGROUND ART

Control motors for servo-valves have been known for a long time. Such control motors are used in connection with a servo-valve for changing a small electrical input signal in an analogue manner to a hydraulic output signal. Different types of such control motors are known. The book "The Hydraulic Trainer" (published by Mannesmann Rexroth in 1981) shows one type of such a control motor (at page 49) as comprising a plate-shaped horizontally located armature. The armature is arranged with its two ends between permanent magnetic fields. Two control coils having the same magnetic polarity can energize the spaced apart ends of the armature which is supported by a resilient tube. Due to such energization a tilting movement of the armature can be created. The tilting movement of the armature is transmitted to a rod connected with said armature. The rod, in turn, controls a hydraulic amplifier.

German laid-open application DE-OS 33 38 602 discloses a control motor having an armature in the form of an elongate hollow cylindrical design. Said armature is surrounded within the housing of the control motor by a control coil. A rod connected with said armature acts as an output member and can directly or indirectly act on a hydraulic component. The reciprocal movement of the lower end of the rod occurs in accordance with a control current supplied to the control coil. Depending on the task of the control motor, the control current can have different frequencies, so that the control motor will show a certain frequency dependency. If one assumes that the control coil is supplied with a current of about 700 mA, a maximum or 100% displacement will be reached for the frequency $f=0$, i. e. the lower end of the output member covers between its two extreme positions, for instance, a distance of 0.8 mm, i.e. 0.4 mm between the center position as well as each one of said extreme positions. With increasing frequency the displacement or amplitude becomes smaller than the 100% value. For a certain frequency an increase of the displacement can occur even to values above 100%. This occurence depends also on the hydraulic system which is actuated by the lower end of the output member. This means, expressed in absolute values: it can occur that the control motor achieves instead of the maximum desired admissible displacement or amplitude value of 0.8 mm, an amplitude of 1.5 mm. This can lead to an excessive load for the components of the control motor, specifically the resilient tube supporting the armature.

German laid-open application DE-OS 34 13 959 discloses a direct driven electro-hydraulic servo-valve which is dampened without providing a speed sensor in the main body of the servo-valve.

German laid-open application DE-OS 35 33 817 discloses a control motor, particularly for a control valve. Frequency-depending passive electric dampening means are provided in the control circuit which comprises the control coil means. This way, mechanical overload situations due to resonance are avoided to a large degree for the components. According to a modification described in said document, a dampening coil is located in the coil body adjacent to the control coil. Said dampening coil can be short-circuited.

Also attention is drawn to the following documents: U.S. Pat. No. 2,162,465, British patent 532,905, U.S. Pat. No. 3,301,141 and German patent 341 525.

It is an object of the present invention to modify the control motor of DE-OS 34 33 817 (corresponding to U.S. Pat. No. 4,761,575) in such a manner that while maintaining at least the same good mechanical and electrical properties the design is simplified, so that the costs of manufacturing are reduced.

It is another object of the invention to provide a control motor which can be more readily assembled.

SUMMARY OF THE INVENTION

In accordance with a first embodiment of the invention the control motor comprises permanent magnet means, control coil means, an armature, said armature being adapted to carry out movements corresponding to a control current supplied to said control coil means, an output member which said armature transmits its motions, said output member being adapted to carry out with its free end a reciprocal movement about a center position, and frequency depending passive electric dampening means which comprise a closed annular shaped disc made of electrically conductive material and arranged axially adjacent to said control coil.

In accordance with another embodiment of the invention the control motor comprises permanent magnet means, control coil means, an armature, said armature being adapted to carry out movements corresponding to a control current supplied to said control coil means, an output member which said armature transmits its motions, said output member being adapted to carry out with its free end a reciprocal movement about a center position, and frequency depending passive electric damping means which comprise a closed dampening coating located on said armature, said coating being made of electrically conductive material.

In accordance with another embodiment of the invention the control motor comprises permanent magnet means, control coil means, an armature, said armature being adapted to carry out movements corresponding to a control current supplied to said control coil means, an output member which said armature transmits its motions, said output member being adapted to carry out with its free end a reciprocal movement about a center position, and frequency depending passive electric dampening means which comprise a closed dampening coil made of electrically conductive material and arranged on a yoke.

BRIEF DESCRIPTION OF THE DRAWINGS

The above and other objects and advantages of the present invention will become apparent to those skilled in the art from the following description when read in conjunction with the accompanying drawings, wherein

FIG. 6 is a schematic representation similar to FIG. 2 showing a first embodiment of the invention;

FIG. 7 is a representation similar to FIG. 6 showing a second embodiment of the invention;

FIG. 8 is a representation similar to FIG. 7 showing a third embodiment of the invention.

DESCRIPTION OF THE INVENTION

Figure 1:
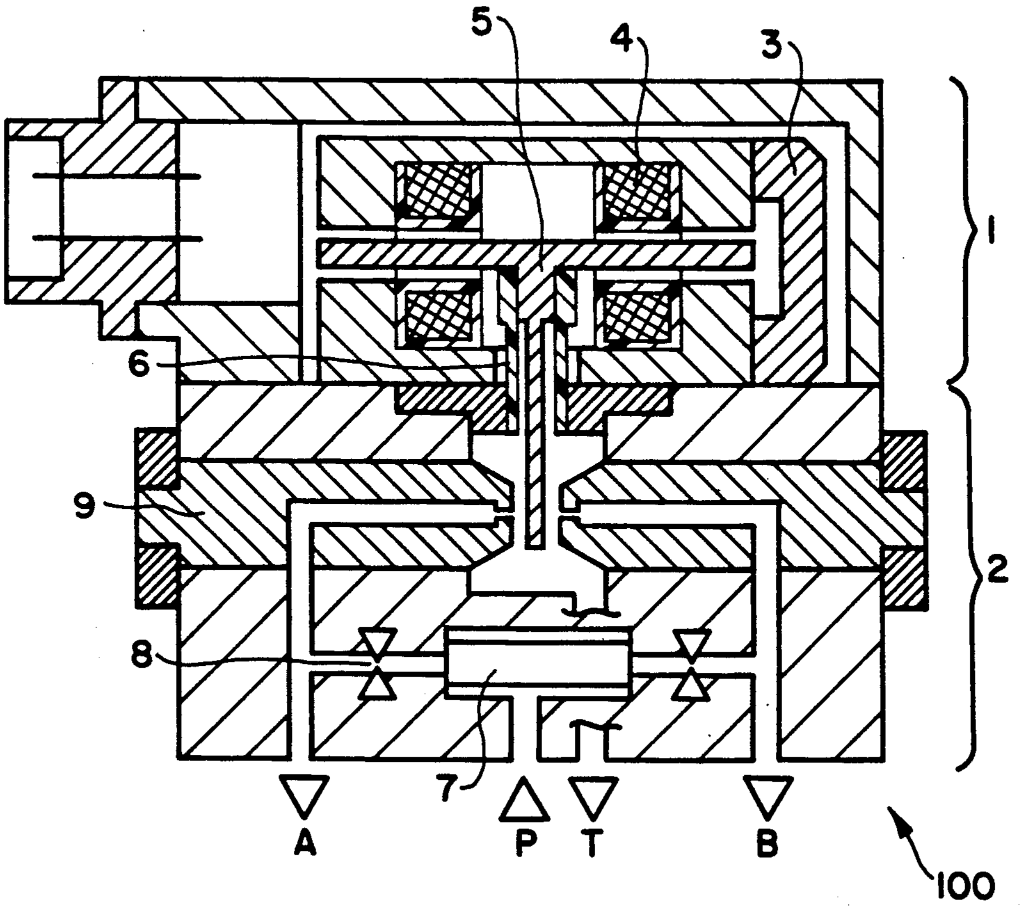
FIG. 1 is a sectional view of a prior art single stage servo-valve comprising a control motor and a hydraulic amplifier.

Referring first to FIG. 1 a prior art single stage pressure servo-valve 100 is shown. Servo-valve 100 comprises an electrical control motor (torque motor) 1 and a hydraulic amplifier 2. The control motor 1 comprises a permanent magnet 3, control coils 4 and an armature 5 having a flapper plate. The control motor 1 transforms a small control current into a proportional movement of the flapper plate. The armature and the flapper plate form a single member which is mounted to a resilient thin-walled tube 6. Tube 6 simultaneously seals the control motor 1 with respect to the hydraulic portion of the servo-valve. The control current or current signal is adapted to energize the control coils and causes a deflection of the armature 5 against the spring force of the tube 6. The direction of deflection depends on the polarity of the control current. The torque or moment acting on the tube and thus the deflection of the flapper plate is proportional to the control current. When the control current is shut off, the tube 6 brings the armature 5 and thus also the flapper plate back into center position. The deflection of the flapper plate is transformed into a hydraulic value in the hydraulic amplifier 2. In FIG. 1 a jet flapper plate system is used as hydraulic amplifier 2. The drawing shows that the pilot oil is supplied from a port P via a small protection filter 7 and continues on to the fixed nozzles or jets 8 and the controllable nozzles or jets 9.

Figure 2:
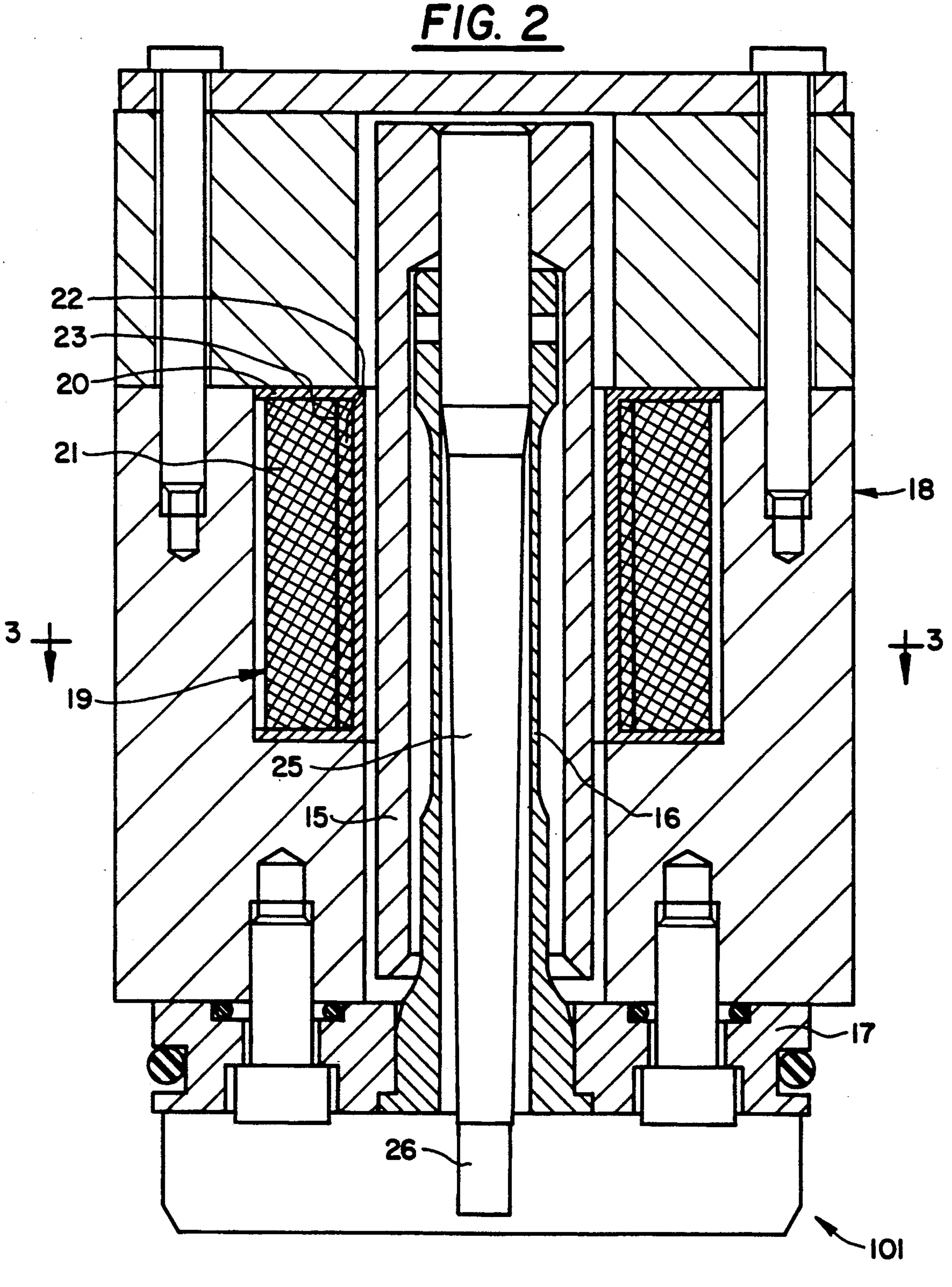
FIG. 2 is a sectional view of a control motor of a generally known design, being provided with a control coil.

FIG. 2 discloses a sectional view of a different embodiment of an electrical control motor referred to by reference numeral 101. This type of electrical control motor 101 is described in detail in West German laid-open application OS 3338 602. Control motor 101 comprises in substance an armature 15 mounted on a resilient tube 16. The resilient tube 16 is mounted in a socket 17. The armature 15 can move under the influence of a control coil 19 and under the influence of permanent magnet means which are also present. The movements of the armature 15 are transmitted to an output member (rod) 25. The lower free end 26 of the rod 25 can carry out a reciprocal movement with respect to its central position. The bottom end 26 can act directly onto a hydraulic component, or cooperates with nozzles as is shown for the control motor 1 of FIG. 1. In accordance with the teaching of U.S. Pat. No. 4,761,575 the control coil 19 located in a housing 18 of the control motor 101 is of a design yet to be described; it is directed to an improvement of the operation of the electric control motor, in particular for a servo-valve. Even though this known design and the invention can be used also in connection with a control motor of FIG. 1, the following description is made in connection with the control motor design of FIG. 2, a design for which the teaching of U.S. Pat. No. 4,761,575 and the invention are particularly advantageous.

In accordance with U.S. Pat. No. 4,761,575 the electric control motor 101 is provided with dampening means such that a trouble-free operation of the control motor can be achieved across a large frequency range. Specifically, dampening means for the control coil (control coil means) 19 are provided. Preferably, the dampening means are provided in the form of a dampening coil 22 which is located adjacent to a main coil 21. The dampening coil 22 is preferably a short circuit coil, i.e. the two ends of the dampening coil 22 are connected with each other. For example, the two ends are soldered to each other.

Further, the control coil 19 comprises a first or main coil 21 and a second or dampening coil 22. Main coil 21 and dampening coil 22 are wound on a single coil body 20 as is shown schematically in detail in FIGS. 3 and 4.

Figure 3:
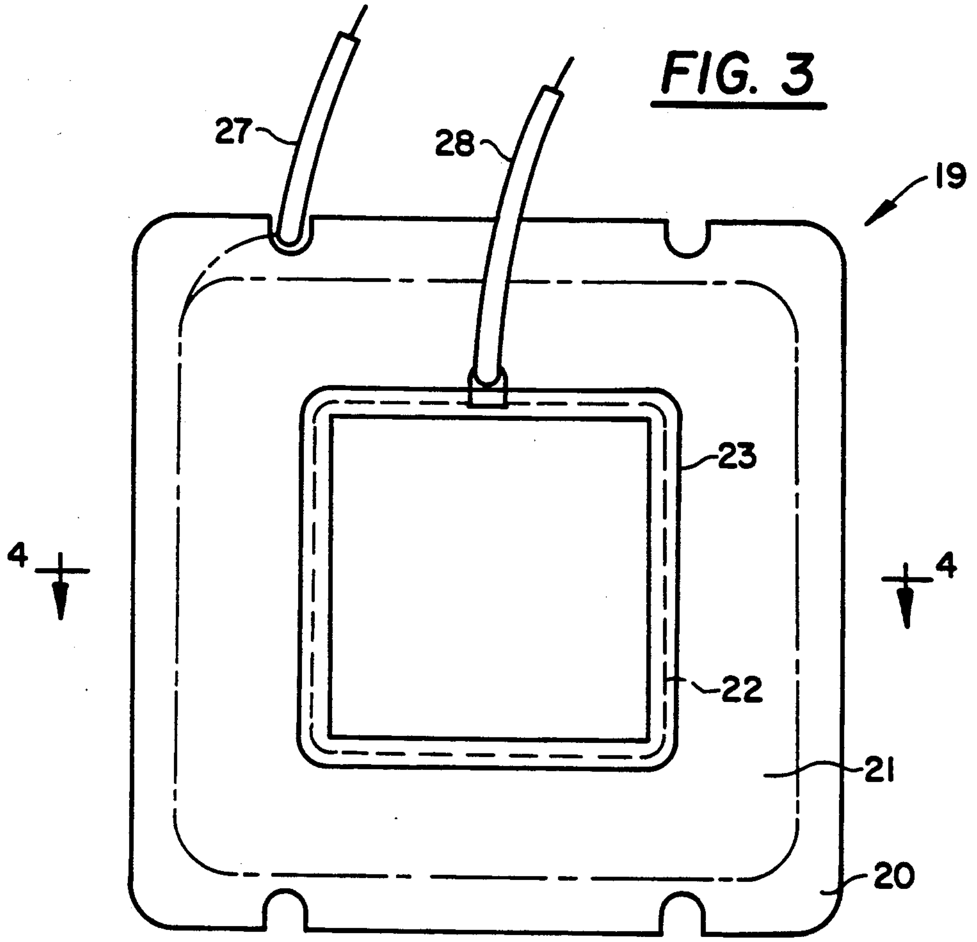
FIG. 3 is a schematic sectional view along line 3—3 in FIG. 2 showning only the control coil.
Figure 4:
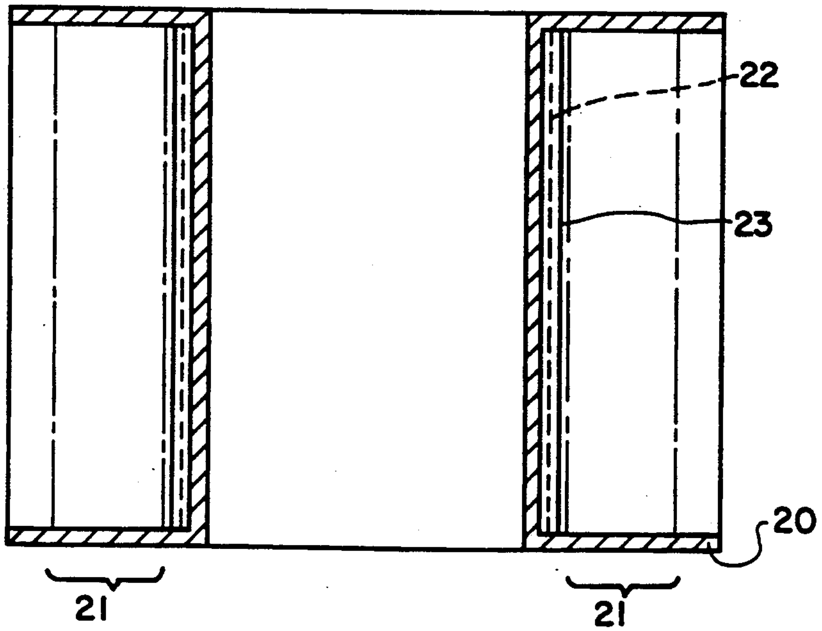
FIG. 4 is a schematic sectional view along line 4—4 in FIG. 3.

As is shown in FIGS. 3 and 4 first the dampening coil 22 is wound onto the coil body 20, which is substantially square-shaped in cross section. For instance, dampening coil 22 comprises forty windings and the two ends of the dampening coil are soldered to each other. Onto the dampening coil 22 the main coil 21 is wound and comprises for instance 600 windings. The resistance of the main coil is, for instance, 9 Ohms The control current for the main coil 21 is, for example, 700 mA. A source of a constant current is used but not shown to supply the main coil 21 with current. Between the dampening coil 22 and the main coil 21 a layer of an insulating film 23 is provided. The insulating film of coil 23 comprises preferably polytetrafluorethylene. The ends 27 and 28 of the main coil 21 extend out of the coil body 20 as is shown in FIG. 3 and are adapted for being connected with the already mentioned source of constant current forming a control circuit.

In the shown embodiment the dampening coil 22 is located immediately adjacent to the main coil 21 within the coil body 20. Generally, the short-circuited dampening coil 22 has to be located in the area of the magnetic field of the main coil 21. Preferably, the dampening coil 22 is located (as is shown) within the main coil 21. However, it should be noted that it would also be possible to wind the dampening coil 22 onto the main coil 21. Moreover, the dampening coil 22 could be wound onto the outside of the armature 15, preferably in the area of the main coil 21.

Figure 5:
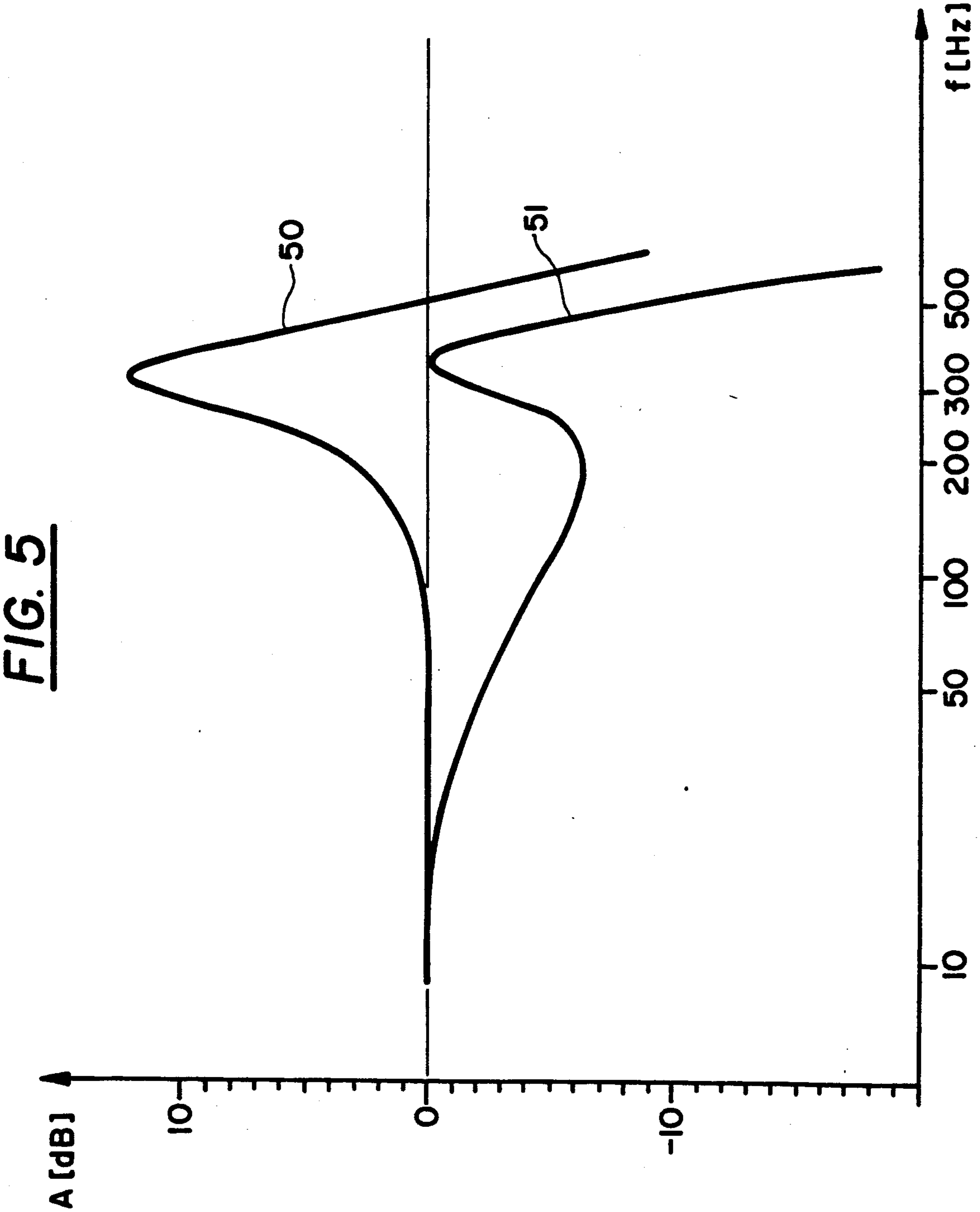
FIG. 5 is a graphic representation of the frequency characteristic of a control motor of FIG. 2 and without dampening means.

FIG. 5 shows a so-called Bode-diagram. This graphic representation will be used to explain the operation of the dampening means of the invention, dampening means which have the form of the dampening coil 22 in the embodiment disclosed.

Curve 50 shows the frequency characteristic of a control motor 100 of FIG. 2 without the dampening coil 22.

In general, FIG. 5 discloses how the displacement of the bottom end 26 of the rod 25 depends on the frequency which is represented on the abscissa in a logarithmic scale. Generally, for the Bode-diagram the following is established:

$$A\ dB = 20.\log X_a/X_e$$

A = amplitude or displacement characteristic $X_a$ = output signal (%)

$X_e$ = input signal (%)

Specifically referring to curve 50 of FIG. 5 it can be seen that in a certain frequency area, i. e. in the area of approximately 300 hertz a significant increase in amplitude occurs. Such an increase is undesirable, because a heavy load is put on the resilient tube 16, which might be stressed too much, so that the control motor 101 breaks. By using the dampening means of the invention the frequency characteristic will follow curve 51, a characteristic which provides significantly improved results.

The basic concept of U.S. Pat. No. 4,761,575 is to remove the area of increase above the admissible value. In accordance with the embodiment shown this is done by dampening means which preferably are in the form of a dampening coil 22. Generally, it is also possible to use instead of the dampening coil 22 other frequency depending components for dampening the main coil 21. For instance, besides inductors also capacitors may be used.

The invention will now be described in connection with a control motor 101 of the type of FIG. 2 (shown in DE-OS 35 33 817), inasmuch as the invention is particularly advantageous for this type of control motor. The invention can be put to work very cost-effectively.

While the present invention will be described with respect to specific embodiments, it is to be understood that numerous changes and modifications may be made in the circuits and arrangements of the elements, therein without departing from the spirit and scope of the present invention as defined in the appended claims.

FIG. 6 discloses a first embodiment of a control motor 102 which comprises yokes 111 which are magnetized by means of permanent magnet means 110 located on said yokes. A coil body or coil support 200 is located within said yokes 111. Said coil body 200 supports a control coil 210 having N1 windings. Within the interior space formed by the yokes 111 an armature 150 is mounted in a known manner. An energization of the control coil 210 will cause small pivotal movements of the armature 150 as is shown by arrow 112.

An output member in the form of a rod 250 is mounted inside of the armature 150 similar to what is shown in FIG. 2. The lower end 260 of said rod 250 is adapted to carry out pivotal movments according to arrow 117, movements which correspond to the energization of the control coil 210.

In accordance with the invention an annular disc made of magnetically and electrically conductive material is arranged adjacent to the control coil 210, or generally speaking, adjacent to control coil means 210. This annular disc will cause substantially the same effect as is obtained by the above described dampening means.

In the shown embodiment the disc 220 is located within the coil body 200 axially adjacent to the control coil 20.

The inner diameter of the disc is preferred to by 115 or d and the outer diameter is referred to by reference numeral 116 or D. The thickness of the disc 220 is referred to by s. It can be recognized that the inner diameter of the disc 220 is somewhat larger than the inner diameter of the control coil 210. Preferably the outer diameter 116 of the disc 220 is somewhat larger than the outer diameter of the control coil 210. The cross section of the disc 220 is adjusted according to the amount of energy which needs to be removed from the control coil 210.

If a sufficiently changing control signal is present, the voltage $$U_2 = U_1 \times \frac{N_2}{N_1}$$

is transformed into disc 220. The disc or ring 220, in turn, has an electrical resistance of $R_2$ depending upon the cross section D-d×s/ 2 and the length of the average circumference $$U_m = \frac{(D + d)}{2} \times \pi.$$

The energy which can be removed by the ring or disc can be determined according to the following energy formula $$P_s = \frac{U_2^2}{R_2} = \frac{\left(\frac{U_1}{N_1}\right)^2}{R_2}$$

in asmuch as the number $N_2$ of windings of the ring or disc 220 is equal to 1. This amount of power energy is removed from the control coil 220 and is transformed into heat and therefore causes a dampening of the higher oscillations.

FIG. 7 discloses a second embodiment of a control motor 103 of the invention. Again, yoke means 111, permanent means 110, a coil body 201, a control coil 210, an armature 151 and an output member 250 having a lower or bottom end 260 are provided. The dampening means 221 has here the form of a copper coating or copper cover provided on the armature 151 and having the appropriate cross section. Said copper coating 221 is either mechanically or galvanically applied to the armature 151.

Preferably, the armature 151 comprises a recess adapted to receive said copper coating 221. The coating 221 consists preferably, but not necessarily, of copper. The control motor 102 requires a somewhat shorter coil body 201 inasmuch as no disc 220 has to be provided inside the coil body. The role of disc 220 is played by the coating 221 in the embodiment of FIG. 7.

In accordance with the invention the electrical resistances of the basic material of the armature 151 with respect to the resistances of the coating material, i.e. the coating 221, are sufficiently far apart, so that cross currents occur only in a limited amount.

FIG. 8 discloses a third embodiment of the invention in the form of a control motor 104 which again comprises yoke means 111, permanent magnet means 110 and an armature 150 which causes the movement of an output member 250 such that the bottom end 260 of said output member 250 can provide the required control. The dampening means are formed by winding a few windings about the yokes. The dampening means 222 are, as shown, preferably short-circuited, so that a short circuit coil is present. In contrast to the prior art the short-circuited coil is located outside of the coil body 202. This has the advantage that the dampening effect can be adjusted for the control motor 104 depending on the required amount of dampening.

We claim:

1. A control motor for a servo valve comprising:

a motor supporting structure;

a pair of yoke means, mounted on said motor supporting structure;

permanent magnet means, associated with said yoke means;

control coil means, supported by said yoke means, and adapted to receive a control current;

an armature pivotally mounted between said pair of yoke means, said armature being adapted to carry out said pivotal movements corresponding to said control current supplied to said control coil means;

an output member located inside of said armature so as to transmit the pivotal movement of the armature by its free end as a reciprocal movement of said output member about a center position, and frequency-dependent passive electric damping means which comprise a closed damping element made of an electrically conductive and frequency dependent material and arranged in a magnetic circuit of the control coil means formed by said yoke means and said armature, wherein said damping element is an annular disc having an outer diameter, and a non zero inner diameter to define an inner open area inside said inner diameter and located adjacent said control coil means, said inner diameter of said disc being larger than an inner diameter of the control coil means.

2. The control motor of claim 1 wherein the cross section of said disc is selected according to the electrical energy which has to be removed from the control coil means.

3. The control motor of claim 1 wherein said disc is located axially adjacent to said control coil means.

4. The control motor of claim 3 wherein said disc is located adjacent to the control coil in a coil body adapted to receive said control coil means.

5. The control motor of claim 1 wherein the control coil means comprises a plurality of windings ($N_1$), and the disc comprises a number of windings $N_2=1$.

6. The control motor of claim 1, further comprising a resilient tube, mounted on said motor supporting structure and supporting said armature.

* * * * *